(12) United States Patent
We et al.

(10) Patent No.: US 12,311,450 B2
(45) Date of Patent: May 27, 2025

(54) APPARATUS AND METHOD FOR MACHINING HOLE FOR OPTICAL FILM

(71) Applicant: Shanjin Optoelectronics (Suzhou) Co., Ltd., Jiangsu (CN)

(72) Inventors: Seong Yong We, Daejeon (KR); Sung Wook Hwang, Daejeon (KR); Bum Seung Lim, Daejeon (KR); Byeong Chan Choi, Daejeon (KR); Seul Ki Park, Daejeon (KR); Ye Jin Mun, Daejeon (KR); Woo Yong Song, Daejeon (KR); Zi Shuo Zhang, Daejeon (KR)

(73) Assignee: Shanjin Optoelectronics (Suzhou) Co., LTD. (CN)

( * ) Notice: Subject to any disclaimer, the term of this patent is extended or adjusted under 35 U.S.C. 154(b) by 738 days.

(21) Appl. No.: 17/290,719

(22) PCT Filed: Oct. 21, 2019

(86) PCT No.: PCT/KR2019/013806
§ 371 (c)(1),
(2) Date: Apr. 30, 2021

(87) PCT Pub. No.: WO2020/096223
PCT Pub. Date: May 14, 2020

(65) Prior Publication Data
US 2022/0001463 A1 Jan. 6, 2022

(30) Foreign Application Priority Data
Nov. 6, 2018 (KR) .......................... 10-2018-0134926

(51) Int. Cl.
*B23B 35/00* (2006.01)
*B23B 51/02* (2006.01)
(Continued)

(52) U.S. Cl.
CPC ................ *B23B 51/02* (2013.01); *B26D 7/02* (2013.01); *B26F 1/16* (2013.01); *B23B 2260/03* (2013.01); *G02B 5/30* (2013.01)

(58) Field of Classification Search
CPC ... B26D 7/02; B26D 7/015; B26F 1/16; B26F 2210/02; B23D 75/00; B23D 81/00; B23B 2270/08
See application file for complete search history.

(56) References Cited

U.S. PATENT DOCUMENTS 3,739,461 A * 6/1973 Cupler, II .............. B23D 77/00
15/236.1
2011/0217133 A1 9/2011 Ibarra et al.
(Continued)

FOREIGN PATENT DOCUMENTS

CN 103785875 5/2014
JP 50-029594 U 7/1973
(Continued)

OTHER PUBLICATIONS

English translation of JP 08323697 (Year: 1996).*
(Continued)

*Primary Examiner* — Alan Snyder

(57) ABSTRACT

Provided are a hole machining apparatus for an optical film, comprising: a clamping part for fixing a plurality of optical films in stacked laminated state; and a machining part for performing a hole operation on a predetermined region of the plurality of optical films so as to sequentially pass through the optical films along the laminated direction in a state where the optical films are fixed to the clamping part, wherein upon the hole operation, the machining part comprises a drill part provided to perform a primary hole machining operation and a bite unit provided to perform a secondary hole operation in the primary hole operation region. Also provided is a hole machining method for an (Continued)

optical film, comprising clamping a plurality of laminated optical films at a predetermined pressure in the hole machining apparatus.

1 Claim, 2 Drawing Sheets

(51) Int. Cl.
 *B23C 3/00* (2006.01)
 *B26D 7/02* (2006.01)
 *B26F 1/16* (2006.01)
 *G02B 5/30* (2006.01)

(56) References Cited

U.S. PATENT DOCUMENTS

| | | | |
|---|---|---|---|
| 2015/0202696 A1* | 7/2015 | Lipczynski | B23C 5/10 |
| | | | 408/199 |
| 2015/0351240 A1 | 12/2015 | Nabeyama | |
| 2017/0232527 A1* | 8/2017 | Henry | B23C 1/08 |
| | | | 408/1 R |

FOREIGN PATENT DOCUMENTS

| | | |
|---|---|---|
| JP | 54-126215 A | 10/1979 |
| JP | 03-142199 A | 6/1991 |
| JP | H08-323697 | 12/1996 |
| JP | 2001-170894 | 6/2001 |
| JP | 2001-293604 A | 10/2001 |
| JP | 2002-036185 | 2/2002 |
| JP | 2004-261990 A | 9/2004 |
| JP | 2009-149471 A | 7/2009 |
| JP | 2015-225960 A | 12/2015 |
| KR | 10-2011-0061326 | 6/2011 |
| TW | 201805095 | 2/2018 |

OTHER PUBLICATIONS

English translation of TW 201805095 (Year: 2018).*
International Search Report and the Written Opinion of PCT/KR2019/013806, mailed Jan. 29, 2020.
Office Action of Taiwanese Patent Office in Appl'n No. 108139032, dated Oct. 5, 2020.

* cited by examiner

APPARATUS AND METHOD FOR MACHINING HOLE FOR OPTICAL FILM

CROSS-REFERENCE TO RELATED APPLICATIONS

This application is a National Stage Application of International Application No. PCT/KR2019/013806 filed on Oct. 21, 2019, which claims the benefit of priority to Korean Patent Application No. 10-2018-0134926 filed on Nov. 6, 2018, the disclosure of which is incorporated herein by reference in its entirety.

TECHNICAL FIELD

The present invention relates to an apparatus and a method for machining a hole for an optical film.

BACKGROUND ART

In order to machine holes in a polarizing plate, the polarizing plate is fixed to equipment, the machining position of the hole is confirmed through a camera, and then the hole machining is performed using a laser.

At this time, as the hole machining of the polarizing plate was made one by one, it took a lot of time for mass production, and depending on raw materials, some materials were damaged upon laser-machining, so that some products were also machined difficultly, and thus there was a problem that it was difficult to apply the hole machining in the conventional way.

BRIEF DESCRIPTION

Technical Problem

It is a problem to be resolved by the present invention to provide an apparatus and a method for machining holes for an optical film which can machine holes in a plurality of polarizing plates at a time during work.

Technical Solution

In order to solve the above-described problem, according to one aspect of the present invention, a hole machining apparatus for an optical film is provided, which comprises a clamping part for fixing a plurality of optical films in a laminated state, and a machining part for performing a hole operation on a predetermined region of the plurality of optical films so as to sequentially pass through the optical films along the laminated direction in a state where the optical films are fixed to the clamping part, wherein upon the hole operation, the machining part comprises a drill part provided to perform a primary hole machining operation, and a bite part provided to perform a secondary hole operation in the primary hole operation region.

Also, the machining part can be provided to perform the hole machining operation so that the diameter of the primary hole is smaller than the diameter of the secondary hole.

Furthermore, the machining part can be provided to perform the hole machining operation so that the center of the primary hole and the center of the secondary hole coincide with each other.

In addition, the drill part can comprise a drill bit having a diameter of 2.4 mm to 3.4 mm.

Also, the drill part can operate at 30,000 to 50,000 RPM and operate at a feeding speed of 2000 to 5000 mm/min upon the primary hole machining.

Furthermore, the bite part can comprise a cutting bite having a diameter of 2.4 mm to 3.4 mm.

In addition, the bite part can operate at 30,000 to 50,000 RPM and operate at a feeding speed of 2000 to 5000 mm/min upon the secondary hole machining.

Also, upon the primary hole and secondary hole operations, the clamping part can have the same clamping pressure.

Furthermore, the hole machining apparatus for an optical film can comprise an alignment part for aligning the positions of the drill and the bite upon the primary and secondary hole operations.

In addition, according to another aspect of the present invention, there is provided a hole machining method for an optical film using the hole machining apparatus for an optical film, wherein the hole machining method for an optical film comprises steps of clamping a plurality of laminated optical films at a predetermined pressure, first punching through polarizing films in a laminated state in order along the lamination direction using a drill bit, and second punching the first punched region with a cutting bite.

Also, the optical film can comprise a polarizing plate.

Furthermore, the hole machining operation can be performed so that the diameter of the first punched hole is smaller than the diameter of the second punched hole, and the hole machining operation can be performed so that the centers of the holes coincide with each other upon the first and second punching.

In addition, the clamping pressure can be 0.1 to 0.2 MPa; upon the first punching, the drill bit can operate at 30,000 to 50,000 RPM and operate at a feeding speed of 2000 to 5000 mm/min; and upon the second punching, the cutting bite can operate at 30,000 to 50,000 RPM and operate at a feeding speed of 2000 to 5000 mm/min.

Advantageous Effects

As described above, according to the hole machining apparatus and method for an optical film related to at least one example of the present invention, it is possible to machine holes in a plurality of polarizing plates at a time during the progress of work, thereby improving productivity.

DETAILED DESCRIPTION

Figure 1:
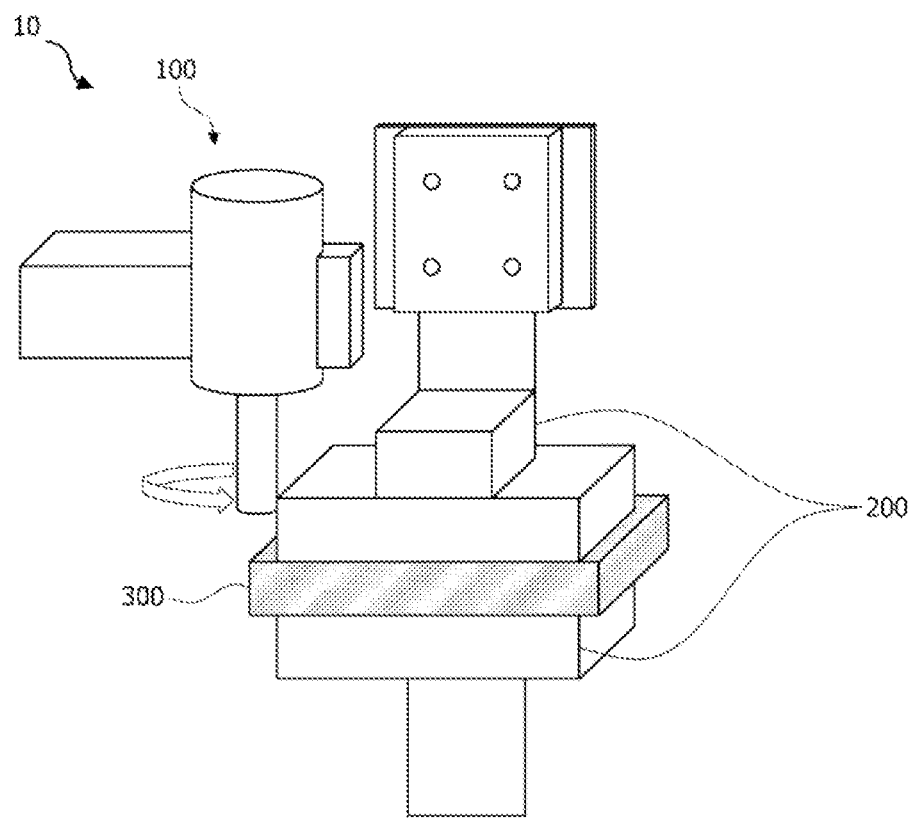
FIG. 1 is a schematic diagram showing a hole machining apparatus for an optical film according to one example of the present invention.

Hereinafter, the hole machining apparatus and method for an optical film according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown can be exaggerated or reduced.

Figure 2:
FIG. 2 is a schematic diagram showing a drill bit in a machining part.
Figure 3:
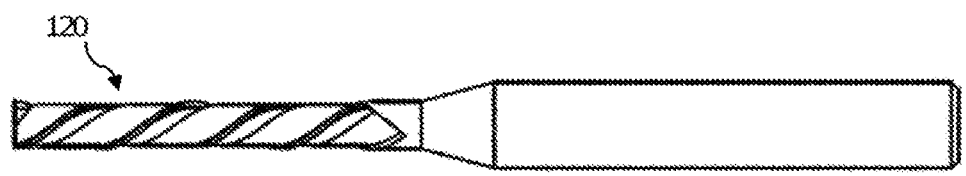
FIG. 3 is a schematic diagram showing a cutting bite of a machining part.

FIG. 1 is a schematic diagram showing a hole machining apparatus for an optical film (10) (hereinafter, referred to as a 'machining apparatus') according to one example of the present invention, FIG. 2 is a schematic diagram showing a drill bit (110) of a machining part, and FIG. 3 is a schematic diagram showing a cutting bite (120) of a machining part.

Figure 4:
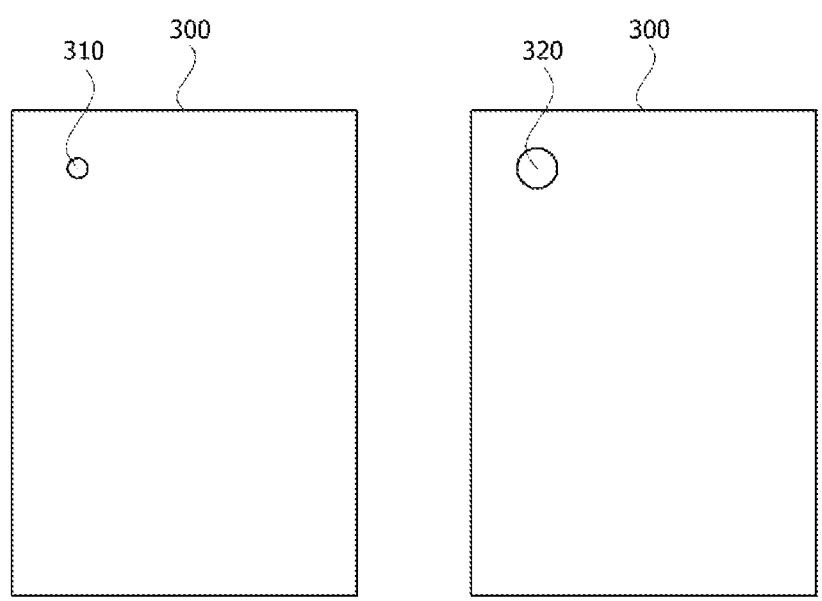
FIG. 4 is a schematic diagram showing a primary hole and a secondary hole of an optical film.

FIG. 4 is a schematic diagram showing a primary hole (310) and a secondary hole (320) of an optical film (300).

In this document, the optical film (300) can comprise, as one example, a polarizing plate. In addition, the machining apparatus (10) can be applied to all other optical films other than the polarizing plate.

The machining apparatus (10) comprises a clamping part (200) and a machining part (100).

Specifically, the machining apparatus (10) comprises a clamping part (100) for fixing a plurality of optical films (300) in a laminated state, where the plurality of optical films (300) in a laminated state can be referred to as an optical film stack. The clamping part (100) can comprise an upper jig and a lower jig, and the optical film stack can be disposed between the upper jig and the lower jig. The clamping part (100) can fix the optical film stack at a predetermined clamping pressure through the upper jig and the lower jig.

The optical film stack fixed to the clamping part (200) can be in a state where several to several hundred optical films are laminated, for example, a state where tens of optical films are laminated. The stack height of such an optical film stack can vary depending on the tool lengths of the drill part and the bite part, and can be, for example, 10 mm.

Also, the machining apparatus (10) comprises a machining part (100) for performing a hole operation in a predetermined region of a plurality of optical films to sequentially penetrate the optical films along the lamination direction in a state where the optical films are fixed to the clamping part (200). That is, the machining part (100) is provided to perform a hole operation so that a predetermined region of an optical film stack is sequentially penetrated along the lamination direction in a state where the optical film stack is fixed to the clamping part (200).

Furthermore, upon the hole operation, the machining part (100) comprises a drill part (110) provided to perform a primary hole (310) machining operation and a bite part (120) provided to perform a secondary hole (320) operation in the primary hole (310) operation region.

On the other hand, the machining part (100) can be provided to perform the hole machining operations so that the diameter of the primary hole (310) is smaller than the diameter of the secondary hole (320). In addition, the machining part (100) can be provided to perform the hole machining operations so that the center of the primary hole (310) and the center of the secondary hole (320) coincide with each other.

Referring to FIG. 2, the drill part (110) can comprise a drill bit having a diameter of 2.4 mm to 3.4 mm. The diameter of the drill bit can vary depending on the diameter of the hole to be machined. The drill bit can be formed, for example, of tungsten carbide and a cobalt alloy.

In addition, the drill part (110) can operate at 30,000 to 50,000 RPM and operate at a feeding speed of 2000 to 5000 mm/min upon the primary hole (310) machining.

Referring to FIG. 3, the bite part (120) can comprise a cutting bite (for example, a mill bite) having a diameter of 2.4 mm to 3.4 mm. The diameter of the cutting bite can vary depending on the diameter of the hole to be machined. The cutting bite can be formed, for example, of tungsten carbide and a cobalt alloy.

In addition, the bite part (120) can operate at 30,000 to 50,000 RPM and operate at a feeding speed of 2000 to 5000 mm/min upon the secondary hole machining.

Also, upon the primary hole (310) and secondary hole (320) operations, the clamping part (100) for fixing the optical film stack can have the same clamping pressure, and for example, the clamping pressure can be 0.1 to 0.2 MPa.

Furthermore, the machining apparatus (10) can comprise an alignment part for aligning the positions of the drill part (110) and the bite part (120) upon the primary and secondary hole (310, 320) operations.

The alignment part can be provided to move the drill part (110) and the bite part (120) by reading the coordinate values of the position where the hole is to be machined based on a predetermined origin in the machining apparatus (10).

Hereinafter, a hole machining method for an optical film (hereinafter, referred to as a 'machining method') using the hole machining apparatus (10) for an optical film having such a structure will be described in detail.

The machining method comprises a step of clamping a plurality of laminated optical films at a predetermined pressure. Also, the machining method comprises a step of first punching through polarizing films in a laminated state in order along the lamination direction using a drill bit. Furthermore, the machining method comprises a step of second punching the first punched region with a cutting bite.

As described above, the optical film can comprise a polarizing plate.

Furthermore, the hole machining operation can be performed so that the diameter of the first punched hole is smaller than the diameter of the second punched hole, and the hole machining operation can be performed so that the centers of the holes coincide with each other upon the first and second punching.

In addition, the clamping pressure can be 0.1 to 0.2 MPa; upon the first punching, the drill bit can operate at 30,000 to 50,000 RPM and operate at a feeding speed of 2000 to 5000 mm/min; and upon the second punching, the cutting bite can operate at 30,000 to 50,000 RPM and operate at a feeding speed of 2000 to 5000 mm/min.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the hole machining apparatus and method for an optical film related to at least one example of the present invention, it is possible to machine holes in a plurality of polarizing plates at a time during the progress of work, thereby improving productivity.

The invention claimed is:
1. A method of hole machining an optical film using a hole machining apparatus,
wherein the hole machining apparatus comprises:
a clamping part for fixing a plurality of optical films in a laminated state; and
a machining part for performing a hole operation on a predetermined region of the plurality of optical films so as to sequentially pass through the optical films along the laminated direction in a state where the optical films are fixed to the clamping part, wherein the machining part comprises:

a drill bit provided to perform a primary hole operation; and a cutting bite provided to perform a secondary hole operation in the primary hole operation region, wherein the hole machining apparatus further comprises an alignment part for aligning the positions of the drill bit and the cutting bite upon the primary and secondary hole operations, wherein the method comprises:

clamping the plurality of optical films in a laminate state at a predetermined pressure in the hole machining apparatus;

first punching through the plurality of optical films in a laminated state in order along the lamination direction using the drill bit; and second punching the first punched region with the cutting bite, wherein hole machining operation is performed so that the centers of the holes coincide with each other upon the first punching and the second punching, wherein the plurality of optical films comprise a polarizing plate, wherein the clamping pressure is 0.1 to 0.2 MPa, wherein upon the first punching, the drill bit operates at 30,000 to 50,000 RPM and operates at a feeding speed of 2000 to 5000 mm/min, wherein upon the second punching, the cutting bite operates at 30,000 to 50,000 RPM and operates at a feeding speed of 2000 to 5000 mm/min, and wherein the hole machining operation is performed so that the diameter of the first punched hole is smaller than the diameter of the second punched hole.

* * * * *